United States Patent [19]
Young

[11] 3,707,873
[45] Jan. 2, 1973

[54] TEMPERATURE MEASURMENT
[76] Inventor: Robert Eric Young, 12 Whitnash Rd., Leamington Spa, England
[22] Filed: Oct. 2, 1970
[21] Appl. No.: 77,688

[30] Foreign Application Priority Data
Oct. 3, 1969 Great Britain......................48,632/69

[52] U.S. Cl......................73/362 R, 73/368, 331/66
[51] Int. Cl.............................G01k 5/18, G01k 5/30
[58] Field of Search................73/368, 362 R; 331/66

[56] References Cited
UNITED STATES PATENTS

| | | |
|---|---|---|
| 3,459,043 | 8/1969 | Young................................73/362 R |
| 2,097,100 | 10/1937 | Linsell..........................73/362 R UX |
| 2,491,486 | 12/1949 | Ewen............................73/362 R UX |
| 2,721,267 | 10/1955 | Collins............................73/362 R X |

Primary Examiner—Louis R. Prince
Assistant Examiner—Frederick Shoon
Attorney—Holman & Stern

[57] ABSTRACT

A device for measuring temperature in which an inductance coil surrounds each arm of a glass manometer containing a liquid such as mercury acted on by a temperature expansive liquid such as ethyl alcohol. Each inductance coil forms part of an oscillatory circuit and the outputs of the two oscillatory circuits are compared in a beat frequency mixer to give a digital representation of the temperature.

1 Claim, 3 Drawing Figures

TEMPERATURE MEASURMENT

This invention relates to methods of and devices for measuring temperature.

According to one aspect of the present invention, there is provided a method of measuring temperature, comprising comparing the difference in positions of columns of liquid in the arms of a manometer caused by the action of a temperature expansive fluid on the liquid, said arms being surrounded by inductance coils so that variation of the column height affects the inductance values, said comparison being effected by comparing the inductances or variations therein of the inductance coils, and utilizing this inductance comparison to provide a measurement of the temperature.

According to another aspect of the present invention, there is provided a device for measuring temperature, comprising a manometer containing a liquid arranged to be acted on by a temperature expansive fluid, an inductance coil surrounding each arm of the manometer and arranged so that a change in position of the column of liquid in the arm due to a change in temperature causes a variation in the inductance of the coil, and means for comparing the inductances or variations therein of the inductance coils to provide a comparison of the difference in position of the column of liquid in the arms and thereby to provide a measurement of the temperature.

Preferably each inductance coil forms part of an oscillatory circuit of an oscillator and the output oscillations are compared so that the difference frequency impulses provide a representation of the temperature being measured.

An embodiment of the present invention will now be described, by way of example, with reference to the accompanying drawing, in which.

Figure 1:
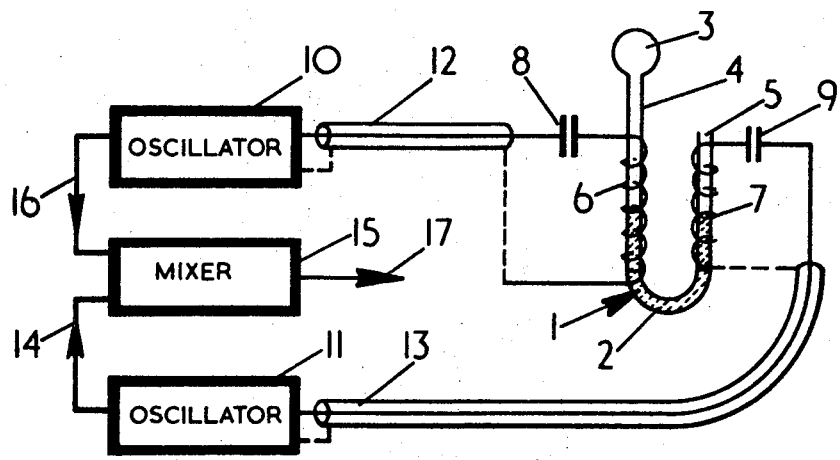
FIG. 1 is a schematic diagram of an embodiment of the present invention.

A device for measuring temperature comprises a glass manometer 1 containing a column 2 of mercury in each arm thereof and having a bulb 3 connected to one arm 4, the other arm 5 being open to the atmosphere. The bulb 3 and the arm 4 to which the bulb 3 is connected are filled with a temperature expansive fluid, in this case ethyl alcohol. Around each arm 4 and 5 of the manometer 1 is arranged an inductance coil 6 and 7, respectively. Each coil 6 or 7 forms with a capacitor 8 or 9, a resonant circuit which forms part of an oscillator 10 or 11, a co-axial cable 12 or 13 connecting capacitor 8 or 9 with the rest of the oscillator 10 or 11.

The two oscillators 10 and 11 are substantially identical and preferably share a dual transistor or are built up on an integrated circuit chip. The oscillator 11 is a Clapp-type oscillator (see FIG. 2) providing an oscillatory output on line 14 to a beat frequency mixer 15. Movement of the mercury along the axis of coil 7 causes variation in the inductance of the coil and hence variation in the frequency of the output on line 14.

Oscillator 10 is similarly connected via the co-axial cable 12 and the capacitor 8 to the inductance coil 6. The output of oscillator 10 is taken on line 16 to mixer 15, the output 17 of which provides a digital representation of the height variation of mercury in the arms 4 and 5, thus giving an indication of the temperature being measured.

Figure 2:
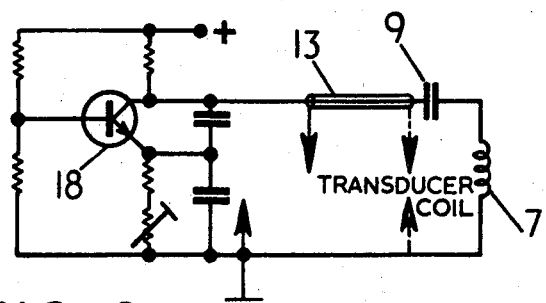
FIG. 2 is a circuit diagram of an oscillator which can advantageously be used in the embodiment of FIG. 1.

FIG. 2 is a circuit diagram of a Clapp oscillator which may be used in the embodiment of FIG. 1. The oscillatory circuit formed principally by capacitor 9 and coil 7 is connected between collector and emitter of a transistor 18 and ground. The advantage of the Clapp type of circuit is that the capacitance of the co-axial cable 13 has but a small effect on the resonant frequency of the oscillator so that a substantial length of cable may be used where necessary.

Figure 3:
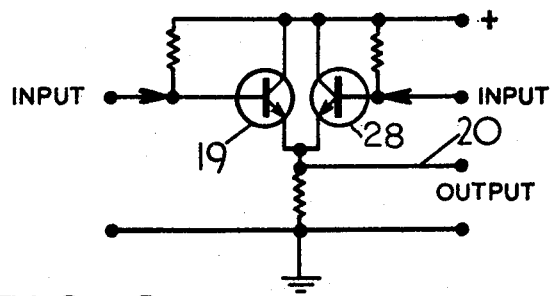
FIG. 3 is a circuit diagram of a mixer which may be used in the embodiment of FIG. 1.

FIG. 3 is a circuit diagram of a beat frequency mixer which may be used in the embodiment of FIG. 1 at 15. The outputs of oscillators 10 and 11 are respectively fed to the inputs of two transistors 28 and 19 (which may be combined in a dual transistor), the output being taken from a common base connection at 20.

If desired, the arm 5 of the manometer 1 which is not connected with the bulb 3 may be sealed off and the space above the mercury in that arm evacuated or filled with an inert gas or with a small quantity of the expansive fluid used in the bulb 3 which latter arrangement would, it is believed, increase the effective temperature range of the device as with the inert gas.

In the place of ethyl alcohol, another expansive fluid may be employed, for example pentane or methyl alcohol. A liquid other than mercury may be employed in the manometer e.g., liquid sodium or potassium. Suitable dielectric materials other than glass may be employed for the manometer.

In a device for measuring temperature according to the present invention, the use of two oscillators to measure the difference in height between columns of liquid in the arms of a manometer and the comparison of the output oscillations from the oscillator to give a difference frequency gives double the sensitivity of that obtained by using a single tube containing an expansive fluid and comparing the single output oscillation with a pre-fixed second oscillator, such an arrangement being described in my British Pat. specification No. 1,077,381.

Furthermore, in a device according to the present invention, any variations in the heights of the columns of the manometer liquid due to expansion of the liquid itself are automatically cancelled out.

I claim:

1. A device for measuring temperature, comprising: a manometer containing a liquid arranged to be acted on by a temperature expansive fluid; an inductance coil surrounding each arm of the manometer and arranged so that a change in position of the column of liquid in the arm due to a change in temperature causes a variation in the inductance of the coil; a capacitor coupled to each inductance coil to form therewith first and second resonant circuits; first and second Clapp-type oscillator means, each comprising a transistor; coaxial cable means for connecting said first and second resonant circuits between the collector and emitter and ground of each said transistor, respectively, whereby said first and second Clapp-type oscillator means oscillate at a frequency determined by the variation in inductance of the inductance coil respectively associated therewith; beat frequency mixer means comprising a transistor pair having their respective collector-emitter paths coupled in parallel circuit arrangement to ground through a resistor, first and second inputs for said mixer means comprising the base of each transistor of the pair to which the outputs of said first and second oscillator means are connected, and a mixer output coupled across said resistor, said mixer output defining a digital representation of the temperature being measured.

* * * * *